United States Patent
Martschitsch

(12)
(10) Patent No.: US 6,223,026 B1
(45) Date of Patent: Apr. 24, 2001

(54) PREPAID MOBILE SUBSCRIBER IDENTIFICATION CARD AND METHOD IMPLEMENTED THEREBY

(75) Inventor: Andreas Martschitsch, Herzogenbuchsee (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/023,077

(22) Filed: Feb. 13, 1998

(30) Foreign Application Priority Data

Dec. 11, 1997 (CH) .................................................. 97/2859

(51) Int. Cl.$^7$ .............................. H04Q 7/32; H04M 11/00
(52) U.S. Cl. .......................... 455/407; 455/558; 379/357
(58) Field of Search .................... 455/405, 406, 455/407, 409, 557, 558, 550; 379/144, 357

(56) References Cited

U.S. PATENT DOCUMENTS

| | | | |
|---|---|---|---|
| 5,359,182 | * 10/1994 | Schilling | 455/558 |
| 5,577,100 | * 11/1996 | McGregor et al. | 455/406 |
| 5,604,787 | * 2/1997 | Kotzin et al. | 455/558 |
| 5,748,720 | * 5/1998 | Loder | 455/406 |
| 5,915,226 | * 6/1999 | Martineau | 455/406 |
| 5,946,613 | * 8/1999 | Hayes, Jr. et al. | 455/407 |

FOREIGN PATENT DOCUMENTS

| | | |
|---|---|---|
| 0 689 368 | 12/1995 | (EP) . |
| 95/28062 | 10/1995 | (WO) . |
| WO 95/28062 | 10/1995 | (WO) . |

OTHER PUBLICATIONS

European Telecommunications Standards Institute, GSM Technical Specification, Digital cellular telecommunications system . . . ; GSM 11.11, Dec. 1995, Version 5.0.0, pp. 1–88.

European Telecommunications Standards Institute, GTM Technical Specification, Digital cellular telecommunications system . . . ; GSM 11.14, Feb. 1996, Version 1.3.0, pp. 1–47.

* cited by examiner

Primary Examiner—Edward F. Urban
(74) Attorney, Agent, or Firm—Pillsbury Winthrop LLP

(57) ABSTRACT

A subscriber identification SIM card for a mobile telephone comprises an advice of charge counter ACM indicating the amount corresponding to the communications carried out with the card. An EEPROM memory in the card includes a file ACMmax, indicating the maximum value of the advice of charge counter, and at least one file $EF_{FDN}$ indicating at least one telephone number free of charge. The invention compares the amount indicated by the advice of charge counter with the maximum amount of the advice of charge counter and blocks calls according to the result supplied. However, the invention does not block calls intended for one or more predetermined numbers stored on the card. It is thus possible to call, for example, an emergency number or the number of a server to reload the card, in the case of a prepayment card, even after the credit on the card has been used up.

14 Claims, 2 Drawing Sheets

PREPAID MOBILE SUBSCRIBER IDENTIFICATION CARD AND METHOD IMPLEMENTED THEREBY

BACKGROUND OF THE INVENTION

Figure 1:
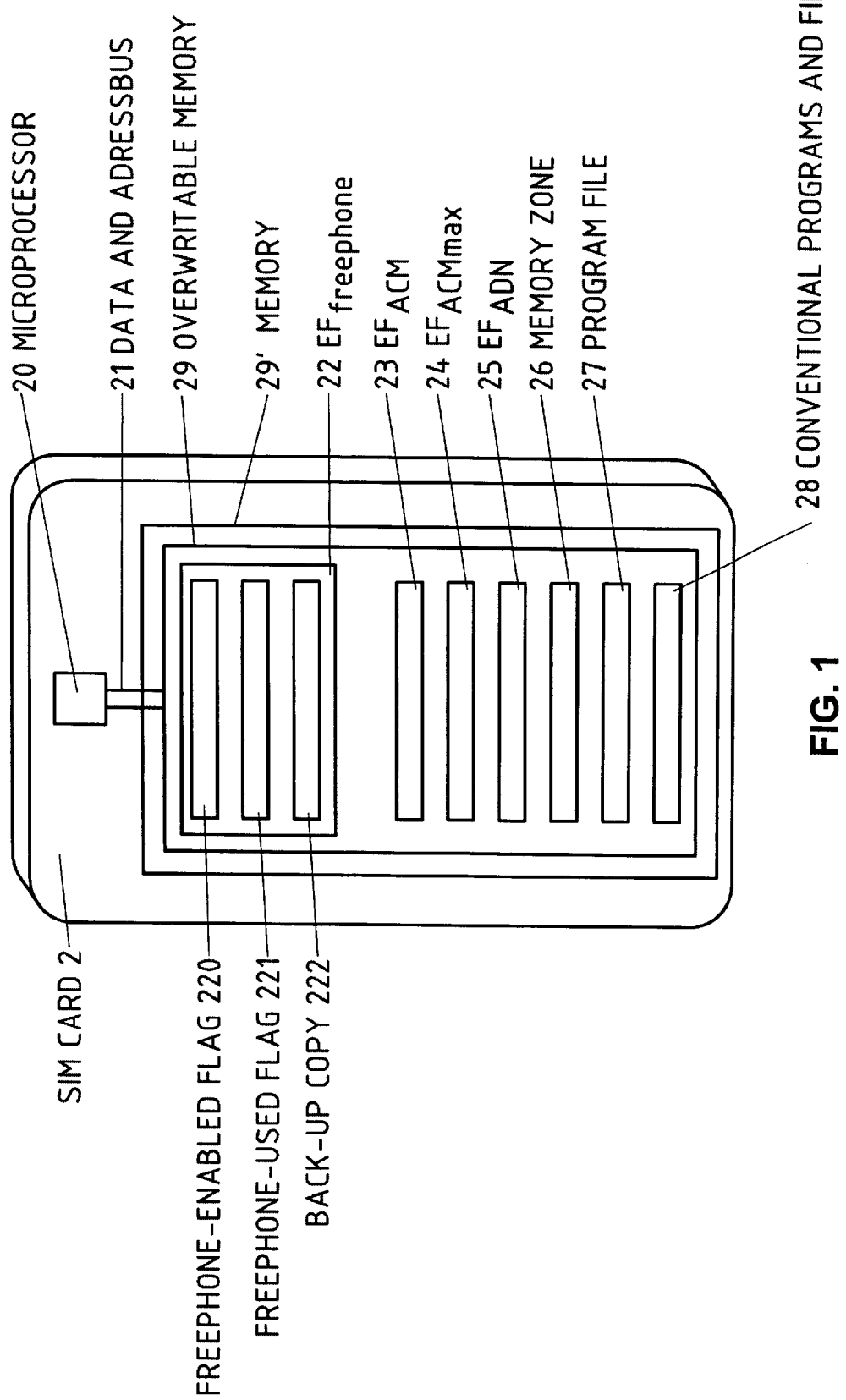

This invention relates to telecommunications equipment, and more particularly to a subscriber identification memory card for such equipment, of the type having an advice of charge counter indicating the amount corresponding to the communications effected with the card, memory means including a file indicating the maximum value of the advice of charge counter and at least one file indicating at least one telephone number free of charge, means for comparing the amount indicated by the advice of charge counter with the maximum amount of the advice of charge counter, and means for blocking calls according to the result supplied by the comparison means.

The invention further relates to a subscriber identification method intended to be implemented by the memory card, of the type including the steps of comparing the amount indicated by an advice of charge counter, corresponding to the communications effected with a SIM card, with a maximum amount stored on the card, and blocking calls made from the card if the metered amount is greater than or equal to the maximum amount.

Mobile subscriber identification cards are used particularly in mobile equipment of the GSM type and enable a subscriber to identify himself vis-à-vis the mobile communication network. In the GSM environment, they are usually called SIM (Subscriber Identity Module) cards.

Recent SIM cards comprise functions whereby the cost of a call can be indicated in currency selected by the user. This service is known as Advice of Charge, abbreviated as AOC. A counter in the card, generally called the ACM (Accumulated Call Meter), adds up the total amount involved in the current call and in all preceding calls. The ACM generally takes the form of an $EF_{ACM}$ file which can be incremented by the microprocessor of the SIM card. An ACMmax (ACM Maximum Value) field stored in an $EF_{ACMmax}$ file on the card indicates the maximum amount of the ACM. The ACM is active only when ACMmax is other than zero; ACMmax may be changed by the user for security purposes, or by the network operator in the case of a prepayment network.

If ACMmax is valid, i.e., other than zero, all calls are blocked as soon as the ACM becomes equal to or greater than ACMmax, possibly after a predetermined interval CAI. The ACM is then reset with the new value at the end of the call; this value may be greater than ACMmax. A message on the display of the subscriber's mobile terminal usually indicates to the user why calls are blocked. All attempts to make calls from the mobile terminal or to receive calls are then blocked until the ACM has been reset. A method of this type is described in International Publication No. WO95/28062, for example.

The AOC function may be used as a security measure by a traveling subscriber to limit the possibilities of use of his SIM card in case of theft, for instance. In this case, the valve of ACMmax, can be changed and the ACM counter reset by the subscriber by entering an additional personal identification number PIN2. The AOC is also used for prepaid smart cards. In this case, the value of ACMmax is made equal to the sales value of the card or to the amount loaded on the card; the ACM is incremented at the time of use, with one incrementation unit corresponding to a predetermined amount in the subscriber's currency. The PIN2 is unknown to the mobile subscriber in the case of prepayment cards.

SUMMARY OF THE INVENTION

It is an object of this invention to provide an improved mobile subscriber identification card equipped with AOC functions and offering an additional service to the users of such cards, and to provide an improved method intended to be implemented by a mobile subscriber identification card. A mobile subscriber provided with a subscriber identification card according to the present invention and having no credit remaining on his card can then call a number stored on his card for the purpose of reloading an amount on his card, or to use his card for emergency calls.

To this end, in the subscriber identification memory card according to the present invention, the blocking means do not block calls intended for one or more numbers stored on the card. The inventive card comprises a processor controlled by a program stored in a memory on the card for carrying out a method of subscriber identification after reinitializing of the card (e.g., after the mobile terminal has been switched on).

In the method according to the present invention, of the type intially mentioned, the blocking step does not relate to calls intended for one or more numbers stored on the card.

Preferred embodiments of the invention will now be described in detail with reference to the accompanying drawings, in which:

BRIEF DRESCRIPTION OF THE DRAWINGS

Figure 2:
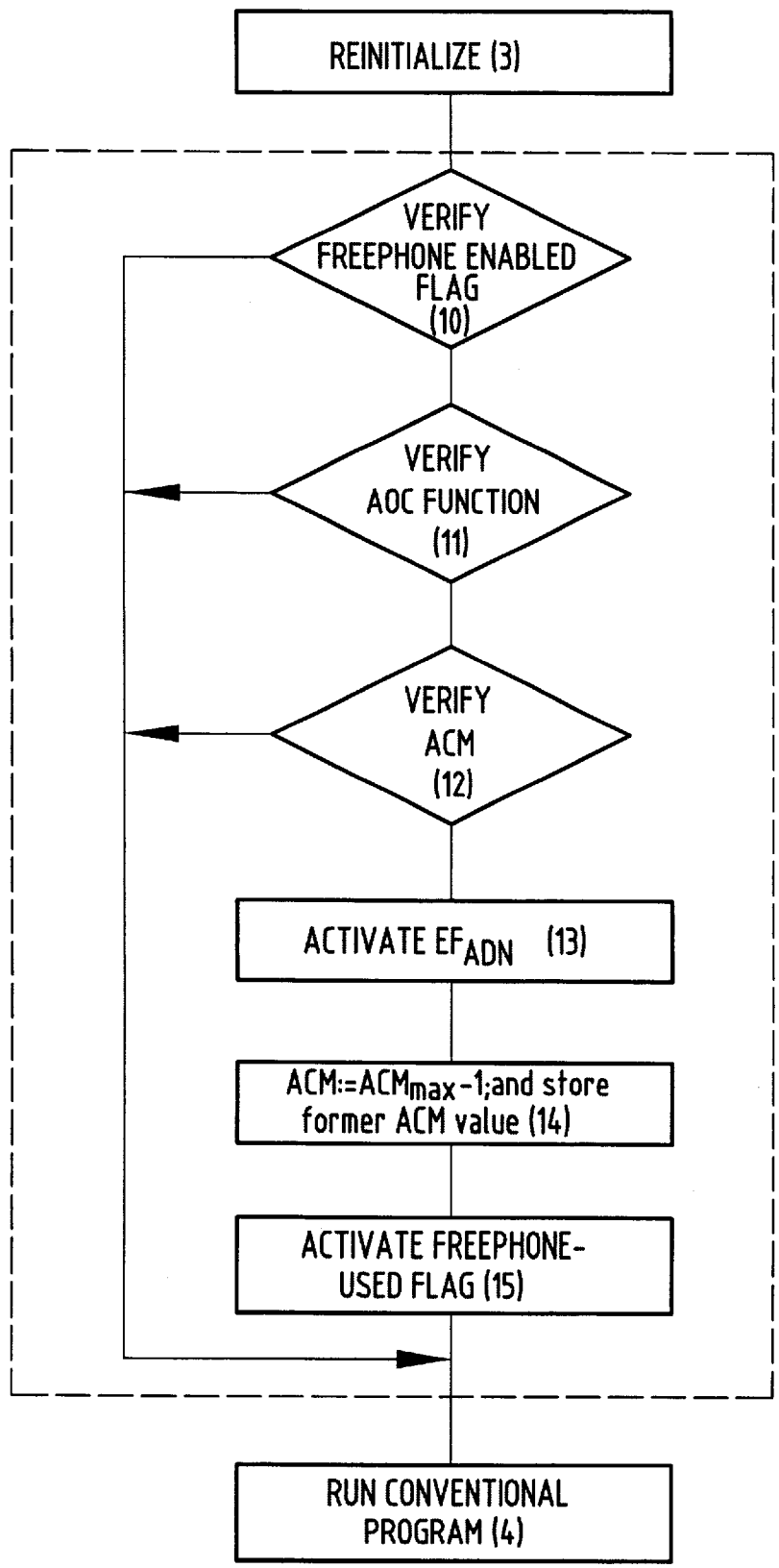

FIG. 1 is a diagrammatic view of a SIM card according to the present invention, and FIG. 2 is a flow chart showing the steps of the inventive method.

DETAILED DESCRIPTION OF THE DRAWINGS

FIG. 1 illustrates a SIM card 2 according to the invention. Although this embodiment relates to the particular case of a SIM card in the GSM environment, those skilled in the art will understand that the invention also applies to any type of mobile subscriber identification card according to any standard of mobile or even wired telephony with identification of the subscriber rather than of the connection. This description will illustrate more particularly the special case of a SIM card where the means necessary for implementing the invention take the form of a processor controlled by a novel program stored in a memory on the SIM card and accessing particular registers on the SIM card. Those skilled in the art will understand, however, that such means may, with no particular difficulty, take the form of hardwire logic, by means of elements such as comparators, registers, logic gates, etc.

SIM card 2 comprises a microprocessor 20 accessing a memory zone 29' via a data and address bus 21. Memory zone 29' may be composed of an integrated circuit separate from microprocessor 20 or preferably be included in the integrated circuit 20. Electrical contacts (not shown) further enable the processor to communicate with the mobile terminal (not shown) in which card 2 may be inserted.

Memory 29' preferably comprises a ROM (not shown) in which the operating system of processor 20 and certain basic GSM programs are stored, as well as an overwritable memory 29 of the EEPROM type, for example, which will be of particular interest here.

According to the invention, the EEPROM memory of the card comprises a novel elementary file $EF_{freephone}$ 22 in which there are stored, among other things, a freephone-enabled flag 220, a second freephone-used flag 221, and a backup copy ACMold 222 of the ACM to be described below. EEPROM memory 29 further comprises a novel program file 27 and four elementary files 23 ($EF_{ACM}$), 24 ($EF_{ACMmax}$), 25 ($EF_{ADN}$), and 26 ($EF_{FDN}$). The part played by these files will also be described below. Memory 29 further contains conventional programs and files 28, e.g., files conforming to the technical specification GSM11.11 or GSM 11.14, obtainable since 1995 and 1996, respectively, from the Secretariat of the European Telecommunications Standards Institute, F-06921 Sophia Antipolis, France.

FIG. 2 illustrates the inventive method which may, for example, be implemented by the novel program stored in file 27 on the card. Upon reinitialization of the card (step 3), the additional program 27 first verifies the freephone-enabled flag 220 (step 10). This flag indicates whether the new functionality of the card is implemented. If not, processor 20 immediately returns to its normal activities (4) as defined, for example, in program 28. If flag 220 is set, the program verifies during step 11 whether the AOC function is implemented on the card. This condition is indicated in the environment by means of the elementary file 24 $EF_{ACMmax}$: when ACMmax is zero, the AOC does not operate, in which case the program is interrupted.

If the AOC is active, the program verifies during step 12 the value of the accumulated call meter (ACM), which value is stored in elementary file 23 $EF_{ACM}$. This meter, forming part of the prior art, is incremented upon each communication by processor 20 so as to indicate the total amount involved in the current call and in all preceding calls. If the ACM is less than the maximum ACMmax stored in file 24 $EF_{ACMmax}$, the SIM card may be used normally: the processor therefore returns to its normal activities (4). Otherwise, the credit has been exceeded. The elementary file 25 $EF_{ADN}$ (Abbreviated Dialing Number) is then activated (step 13) which, in accordance with the standard GSM11.11, permits the use of the numbers stored in file 26 $EF_{FDN}$. The ADN validation simultaneously blocks the other telephone numbers.

The value of the ACM in the file $EF_{ACM}$ is then changed during step 14 in order to permit the use of the telephone. For this purpose, program 27 carries out the instruction ACM:=ACMmax−1

This operation amounts in fact to crediting the mobile subscriber with one unit, if the ACM had reached exactly the value ACMmax (ACM=ACMmax), or with more that one unit if the ACM had already exceeded ACMmax.

If the network administrator wishes to invoice these credited units to the subscriber later on, the number of them must be stored. For this purpose, the former ACM value is stored during the same step 14 in the elementary file $EF_{freephone}$ 22 under the field ACMold (222).

In a modification of the invention, it is possible to change temporarily the maximum value ACMmax instead of the ACM to permit temporary use of the telephone.

During the following step 15, the freephone-used flag 221 in register 22 is activated. The processor then goes on to the running (4) of the conventional program 28. The subscriber can then call solely the numbers stored in file 26 $EF_{FDN}$ on the card. These numbers may, for example, include service numbers permitting the card to be reloaded with an amount of money in the case of a prepayment card, or emergency numbers which must not be blocked under any circumstances. File $EF_{FDN}$ is preferably predefined at the time the card is personalized and can be accessed by the mobile subscriber only in read mode (read-only file); it is thus impossible for the subscriber to add telephone numbers to his file which he could call after the credit on his card is used up.

The card may, for example, be reloaded by calling a number provided for that purpose and stored in file $EF_{FDN}$. Procedures for reloading cards by means of a telephone call have been disclosed, especially in the SICAP environment described in patent application EP 94810363.5. The reloading procedure applied here, however, comprises additional steps which are implemented when flag 220 (freephone-enabled) in file 22 $EF_{freephone}$ is activated, which is the case only if the mechanism described above has been used. In this event, the ACM is first reset to the value ACMold stored in field 222 of file $EF_{freephone}$, then the value of the ACM and/or of ACMmax is changed as a function of the amount loaded on the card, as in the case of conventional reloading. This amount may, for example, be transmitted from the server called to card 2 by means of SMS (Short Message System) or USSD messages, whereupon flag 221 is reset (freephone not used). File $EF_{ADN}$ is then deactivated in order to permit the use of standard telephone numbers rather than just those stored in file $EF_{FDN}$.

Although the above description relates more particularly to a design comprising a processor in the SIM card specifically programmed by instructions stored in memory 29 to carry out the desired functions, those skilled in the art will understand that the card can be made to act in the same way by means of an electronic circuit without software components. Tests 10, 11, and 12, aimed at changing the action of card 2 according to the values of registers 220, 24, and 23, may thus be carried out simply by means of register comparators of a type known per se. By connecting an AND gate at the output of these comparators, a signal is then obtained which has the value of 1 only when the three tests have been passed, i.e., only when $EF_{freephone}$ is activated, when ACMmax is other than zero, and when the ACM is greater than or equal to ACMmax. This signal at the output of the AND gate can then be used to change the contents of $EF_{ADN}$ so as to activate it, to decrement the ACM, and to activate flag 221 (freephone used).

Those skilled in the art will note that the operation of the memory-equipped SIM card and of the mobile terminal in which it is inserted is modified by the novel means and process steps of the present invention. Furthermore, this invention allows a SIM card to be reloaded by means of SMS or USSD messages even when the credit on the card has been exceeded and all ordinary calls from or to this card are therefore blocked.

What is claimed is:

1. A subscriber identification memory card for telecommunications equipment comprising:
   a processor controlled by a program stored in a memory on the card for carrying out a method comprising:
      comparing the amount indicated by an advice of charge counter, corresponding to the communications effected with a SIM card, with a maximum amount stored on the card;
      blocking calls made from the card if the amount of the counter is greater than or equal to the maximum amount; and
      reloading the advice of charge counter by means of short messages transmitted by a server which can be called by means of a non-blocked number during said blocking operation,
   wherein said blocking of calls does not relate to calls intended to one or more predetermined numbers stored on the card, and said calls intended for one or more predetermined numbers are stored on the card in a file having no write access from the mobile terminal.

2. A memory card according to claim 1, wherein said method is carried out upon initialization of the card.

3. A subscriber identification memory card for telecommunications equipment, comprising:

an advice of charge counter indicating an amount corresponding to the communications effected with the card;

memory means including a file indicating a maximum value of the advice of charge counter and at least one file indicating at least one telephone number free of charge;

comparison means to compare said amount indicated by the advice of charge counter with said maximum value of the advice of charge counter;

blocking means to block calls according to the result supplied by the comparison means;

wherein said blocking means do not block calls intended for one or more predetermined numbers stored on the card;

said non-blocked calls are indicated in a file having no write access from the mobile terminal; and said numbers stored in a file having no write access from the mobile terminal include at least the number of a server permitting the charge counter of the memory card to be loaded by means of short messages.

4. A memory card according to claim 3, further comprising a flag on the card indicating whether said comparison means must be activated upon initialization of the card.

5. A memory card according to claim 4, further comprising means for decrementation of the advice of charge counter by a value sufficient to permit the setup of calls from the card.

6. A memory card according to claim 5, further comprising a file storing a value permitting determination of the number of units by which the charge counter has been decremented during said decrementation step.

7. A telecommunications terminal containing a subscriber identification memory card according to claim 3 controlled by a method according to claim 8 and using registers and data stored on said memory card so as to affect the technical operation of said memory card and said telecommunications terminal.

8. A method to be implemented by a subscriber identification card for telecommunications equipment, said method comprising:

comparing the amount indicated by an advice of charge counter, corresponding to the communications effected with a SIM card, with a maximum amount stored on the card;

blocking calls made from the card if the amount of said counter is greater than or equal to said maximum amount; and reloading the advice of charge counter by means of short messages transmitted by a server which can be called by means of a non-blocked number during said blocking operation, wherein said blocking of calls does not relate to calls intended for one or more predetermined numbers stored on the card; and said calls intended for one or more predetermined numbers are stored on the card in a file having no write access from the mobile terminal.

9. A method according to claim 8, wherein said method is executed during the initialization of the card.

10. A method according to claim 9, wherein said method comprises following previous tests:

test of a flag stored on the card and indicating whether this functionality is activated, test of activation of the advice of charge function by means of the counter, and in that the method is interrupted if the two tests are not passed.

11. A method according to claim 8, wherein said method comprises a decrementation step after said blocking step, during which the advice of charge counter is decremented by a value sufficient to permit the setup of calls from the card.

12. A method according to claim 11, wherein that a value permitting the determination of the number of units by which the charge counter was decremented during said decrementation step is stored on the card.

13. A method according to claim 12, wherein said advice of charge counter is incremented during said reloading by the number of units decremented during said decrementation step.

14. A method according to claim 8, wherein said method comprises an incrementation step, after said blocking step, during which the maximum value of the advice of charge counter is incremented by a value sufficient to permit calls to be established from the card.

* * * * *